F. L. O. WADSWORTH.
ART OF TEEMING GLASS.
APPLICATION FILED JAN. 13, 1908.

921,923.

Patented May 18, 1909.
2 SHEETS—SHEET 1.

WITNESSES
Francis J. Tomasson
J. Herbert Bradley.

INVENTOR
Frank L O Wadsworth
by Christy and Christy
ATTY'S

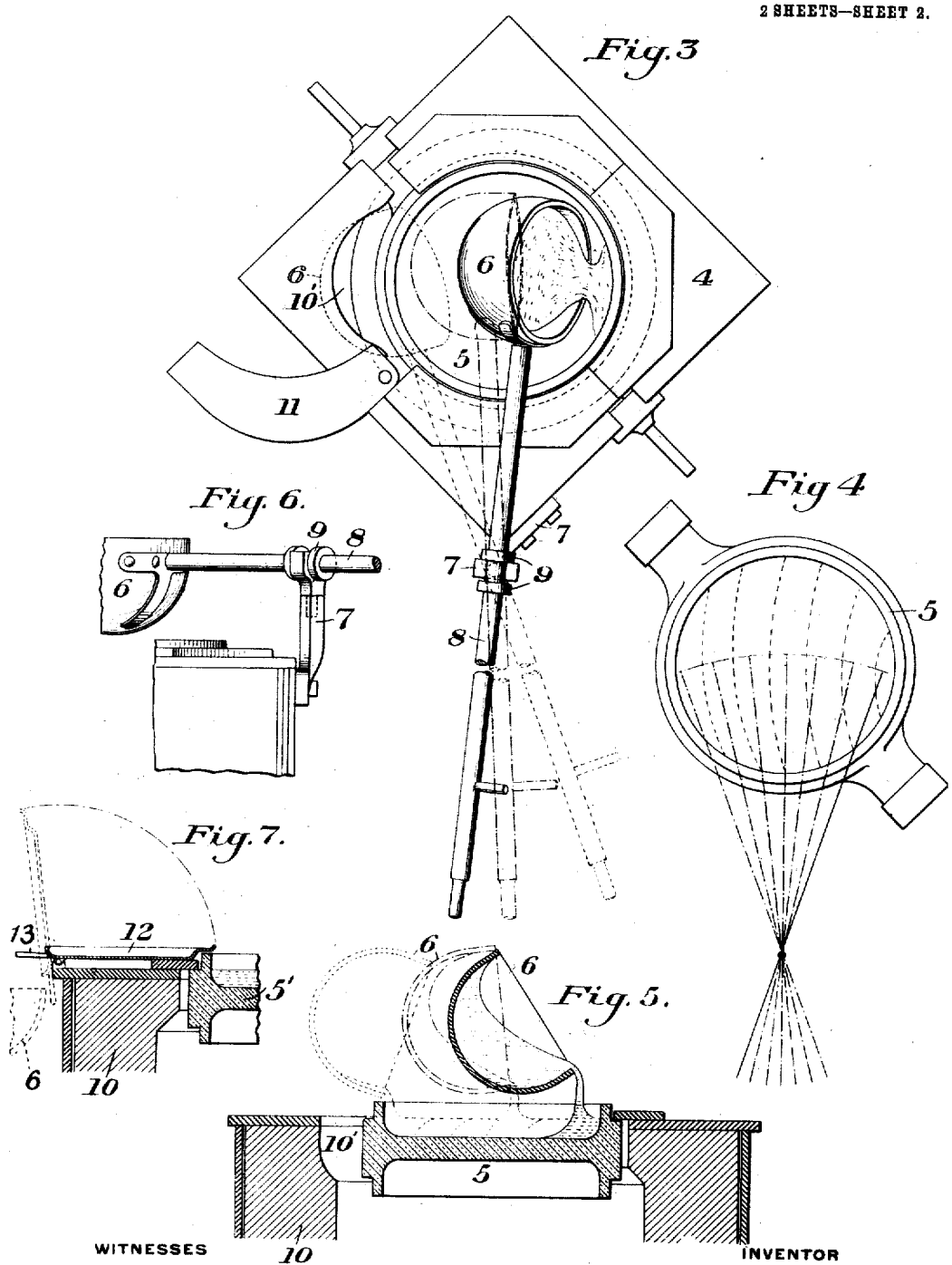

UNITED STATES PATENT OFFICE.

FRANK L. O. WADSWORTH, OF SEWICKLEY, PENNSYLVANIA.

ART OF TEEMING GLASS.

No. 921,923.　　　　Specification of Letters Patent.　　　Patented May 18, 1909.

Application filed January 13, 1908. Serial No. 410,563.

*To all whom it may concern:*

Be it known that I, FRANK L. O. WADSWORTH, residing at Sewickley, in the county of Allegheny and State of Pennsylvania, a citizen of the United States, have invented or discovered certain new and useful Improvements in the Art of Teeming Glass, of which improvement the following is a specification.

In one of the methods of forming glass sheets the molten glass is transferred by ladles from the melting tank or pot to the receptacle from which the glass is drawn to form the cylinder or sheet. Under the present practice the ladle is held stationary, except as regards its rotary movement, so that as the tipping progresses the stream of metal moves across the receptacle. It has been found that the edges of the stream cool quite rapidly, and in the movement of the ladle in reverse direction to cut off the stream of glass, the latter is reduced in volume and moves back across the surface of the glass in the receptacle toward its starting point. The thinning of the stream so accelerates the cooling, that lines of chilled glass are formed in the surface of the glass in the receptacle and these lines appear spread out, and magnified in the drawn article. And further in the present method the glass flows onward from the point of pour in superposed waves or folds in which air is liable to be caught forming bubbles adjacent to the center of the pot from which position they cannot be readily removed.

The invention described herein relates to an improved method of teeming the glass into the receptacle from which it is to be drawn, and consists in causing the stream of glass to move continuously and progressively for its first point of entrance into the receptacle, across the latter and beyond its edge, the cutting off of the stream by reversing the rotation of the ladle, being effected outside of the periphery of the receptacle. As the glass in my improved method advances in a single wave or fold across the pot or receptacle, any air adhering to the surface of the stream will be pushed along to the side of the receptacle and can be easily removed.

The invention is hereinafter more fully described and claimed.

Figure 1:
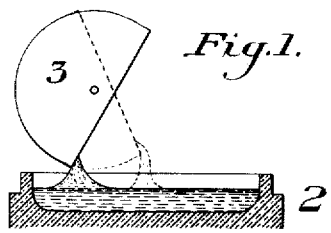
Figure 2:
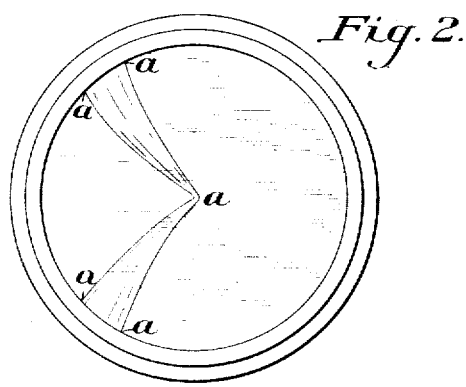
Figure 8:
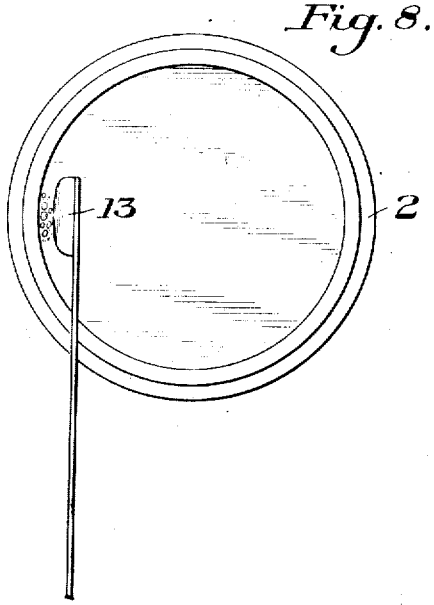

In the accompanying drawings forming a part of this specification, Figures 1 and 2 are respectively, a diagrammatic section and a plan illustrating the usual practice of teeming glass into drawing pots or stools; Fig. 3 is a top plan view of a form of apparatus adapted to the practice of my invention; Fig. 4 is a diagrammatic view showing successive horizontal positions of the ladle; Fig. 5 is a sectional elevation showing the ladle in successive tipping and horizontal positions; Fig. 6 is a detail view showing a support for the ladle while teeming; Fig. 7 is a sectional detail showing a catch device for the tailings and Fig. 8 is a plan view showing the manner of removing bubbles or other imperfections from the glass.

As shown in Fig. 1 the ladle is held, under the present practice stationary horizontally relative to the receiving receptacle and the stream of glass is also horizontally stationary, except for the backward movement of the lip of the ladle as it is tipped to pour and the corresponding forward movement as the turning of the ladle is reversed to cut off the flow from the ladle. The stream of glass flowing from the ladle is the thinnest at its edges and the glass forming such edges will cool more rapidly than the body of the stream. And further as the quantity of the glass in the ladle decreases the outflowing grows thinner, and the edges also become thinner, thus facilitating their chilling. When the rotation of the ladle is reversed to stop the flow of the stream, the stream is drawn to practically a string and chills very rapidly. During this reduction in volume the lip of the ladle is moving in a horizontal direction toward the initial point of pour depositing the chilled threads in converging lines on the surface of the glass as shown in Fig. 2. In drawing the glass these chilled threads appear in series of parallel lines in the finished articles.

In the practice of my invention, the ladle 1 in addition to the usual tipping movement is shifted continuously from the beginning of the tipping in a substantially horizontal direction, so that the stream of glass will move across the receptacle. It is preferred that at the beginning of the pour, the stream should enter adjacent to the side wall and move progressively and continuously across the receptacle and out of the same. The rate of movement of the stream should correspond approximately to the rate of flow which the glass would have if the stream was stationary and the glass flowed outwardly from a common center. By starting the pour at one side and moving the stream at the rate stated, the receptacle will be filled by horizontally added increments rather than by the horizontal flow from one point to another, as in the present practice. The horizontal movement of the stream is continued by the edge of the receptacle and it is preferred that there should not be any great reduction in the volume of the stream until the latter has passed outside of the receptacle. By this method of pouring, the glass forming the edges of the stream and which may become somewhat chilled will be at or adjacent to the sides of the receptacle.

While my improved method can be carried out by the manual movement of the ladle, it is preferred to provide a steadying support which may consist of a bracket 7 having a forked end, secured in suitable position to the side of the furnace 10, upon which the pot or stool 5 is supported. The forked portion of the bracket is pivotally mounted so as to permit of the lateral swinging of the ladle. The handle 8 of the ladle 6 is preferably provided with collars 9 to prevent the handle moving back and forth on the bracket. The latter portion of the charge in the ladle will flow into a pocket or recess 10 which is within the furnace and is covered except while the pot is being filled, by suitable means as a removable section 11 of the top stone of the furnace, or the tailings from the pot may be caught in a pan 12, which may be pivotally mounted on the furnace as shown in Fig. 7.

In the use of this apparatus, the ladle is swung over the pan and then depressed into the position shown in dotted lines in Fig. 7. As it is dropped past the edge of the pan, it strikes an arm 14 and tilts the pan into the position shown in dotted lines thereby automatically discharging the tailings back into the ladle.

It is characteristic of my improved method that the tailings from the pot which are the source of the "ladle lines" in the finished product, never enter the pot, but are discharged entirely outside of the same. Also that any air bubbles or other similar defects which are trapped in the glass during the teeming are swept toward the edge and concentrated at a point where they can be readily removed by skinning.

I claim herein as my invention:

1. As an improvement in the art of charging drawing pots, the method herein described which consists in causing the stream of glass to move progressively along the receiving vessel and beyond the edge thereof.

2. As an improvement in the art of charging drawing pots, the method herein described which consists in starting the pouring operation within the receptacle and maintaining the inflow until the stream of metal is outside of the edge of the receptacle.

3. As an improvement in the art of charging drawing pots the method herein described, which consists in filling the same by horizontally added increments of molten glass.

4. As an improvement in the art of charging drawing pots, the method herein described, which consists in causing the stream of glass flowing into the pot to move to and beyond the edge of the pot.

5. As an improvement in the art of charging drawing pots, the method herein described, which consists in commencing the inflow adjacent to one side of the pot and causing the inflowing stream to move across and beyond the edge of the pot.

6. In an apparatus for teeming metal, the combination of a movable pan arranged adjacent to the receptacle into which the metal is to be teemed, and a movable ladle, the pan being adapted to be shifted by the ladle to discharge its contents into the ladle.

7. In an apparatus for teeming metal, the combination of a pivotally mounted pan provided with a projecting arm and a movable ladle, said parts being so arranged that the pan will be tipped by the ladle striking the arm and discharge its contents back into the ladle.

In testimony whereof, I, have hereunto set my hand.

FRANK L. O. WADSWORTH.

Witnesses:
JAS. W. DRAPE,
FRANCIS J. TOMASSON.